(No Model.) 2 Sheets—Sheet 2.
H. SMITH.
MAP HOLDER.
No. 507,178. Patented Oct. 24, 1893.
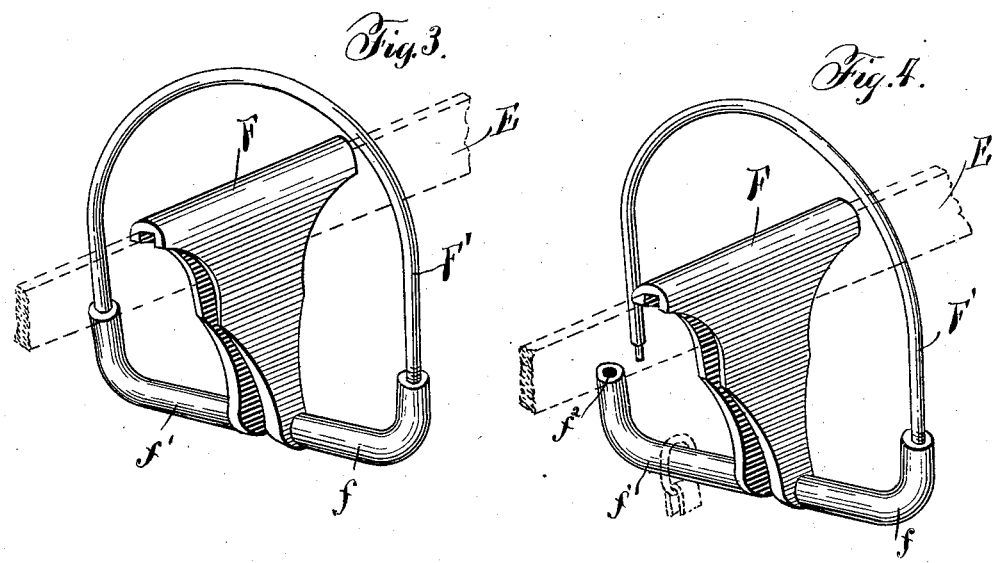
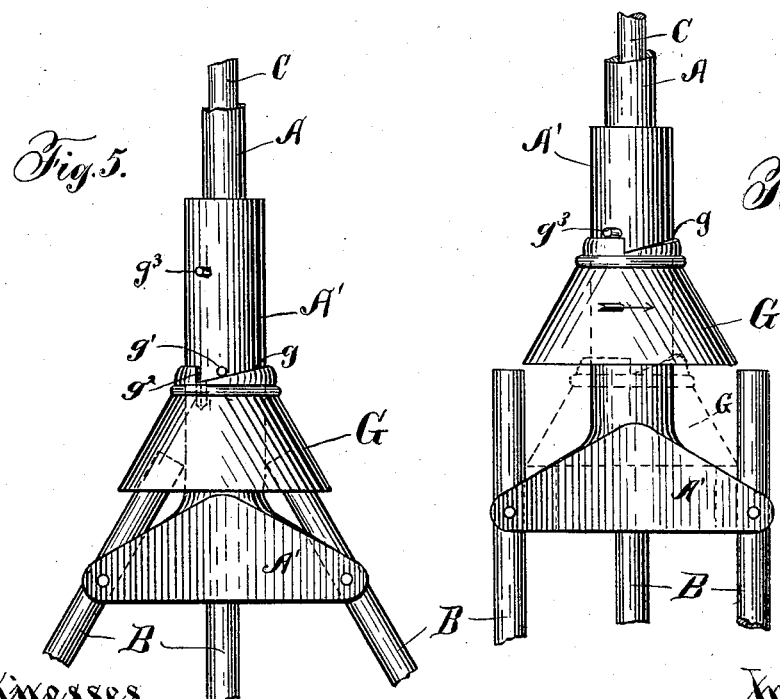
Witnesses,
Thos. D. Sheridan
Samuel E. Hibben
Inventor,
Henry Smith
By Banning and Banning and Payson
Attorneys.

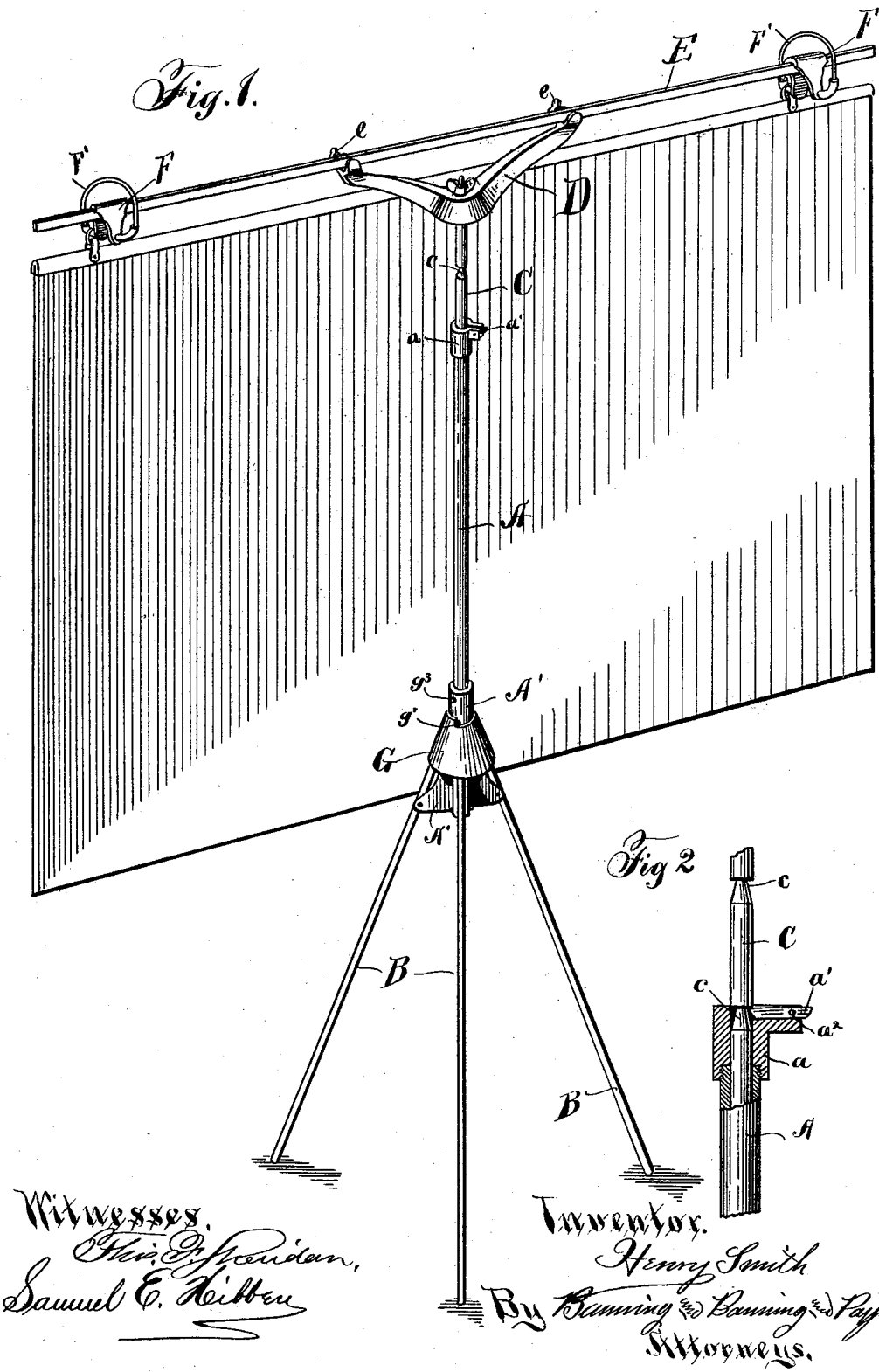

UNITED STATES PATENT OFFICE.

HENRY SMITH, OF CHICAGO, ILLINOIS.

MAP-HOLDER.

SPECIFICATION forming part of Letters Patent No. 507,178, dated October 24, 1893.

Application filed November 1, 1892. Serial No. 450,647. (No model.)

*To all whom it may concern:*

Be it known that I, HENRY SMITH, of Chicago, Illinois, have invented certain new and useful Improvements in Map-Holders, of which the following is a specification.

The object of my invention is to make a simple and efficient stand or holder for maps, charts, &c.; and my invention consists in the features and details of construction hereinafter described and claimed.

In the drawings, Figure 1 is a perspective view of my improved map holder; Fig. 2 a detail view of the means used for obtaining vertical adjustment; Fig. 3 a perspective view of one of the saddle rings from which the maps are suspended, showing the ring closed; Fig. 4 a similar view of the same, with the ring open to permit the insertion or removal of maps; Fig. 5 a detail view of the means used for holding the tripod open; and Fig. 6 a similar view, showing the tripod in position to be folded.

In making my improved map holder or stand, I use a standard A, supported in a casting A', to which are pivoted at its lower end legs, or tripods, B, near their upper ends. The standard A can be made of hollow tubing or pipe, to permit the insertion of the rod C, which carries the yoke D for connecting the supporting bar E to the standard. The supporting bar is held rigidly in the yoke by means of set screws $e$, or in any other desirable way. Mounted on the supporting bars are saddle rings F, for supporting maps therefrom.

In order to give the rod C vertical adjustment, it enters the hole in the standard A loosely, so as to easily rotate therein as desired. At the upper end of the standard is a collar $a$, carrying and supporting a pawl $a'$. This pawl is pivoted to the collar at $a^2$, and is so constructed and arranged that it enters a notch $c$ of the rod C, in such manner as to support the rod when in the position shown in Fig. 2. To adjust the rod vertically, all that is necessary is to raise the same, which action raises the inner end of the pawl, until the desired height is attained, when it enters another notch $c$, and the rod, being allowed to drop back a trifle, the pawl supports it in such position. The rod can be provided with any number of notches, $c$, to give it a corresponding number of adjustments. It will be noticed that this adjustment is in the form of a telescopic adjustment, and when it is necessary to collapse the standard, or allow the rod to drop down to its lowest position, it must first be raised slightly to free its notch from the pawl, and the pawl pressed down on its outer end to hold it in its free position, thus allowing the rod to be dropped or closed to its lowest position.

The legs or tripod B are pivoted near their upper ends to the casting A', in such a manner that they can be locked in their open position, as shown in Figs. 1 and 5. To lock the tripod in its open position, I mount loosely on the casting A', a funnel-shaped piece G, having a cam surface $g$ on its upper portion, adapted to engage with a pin $g'$ on the casting, in such manner that on partly turning the piece G, its cam surface, bearing against the pin $g'$, presses the piece G downward, and the same contacting with the upper ends of the legs locks them firmly against the casting and prevents them from being closed. To allow the tripod to be collapsed or folded, the piece G is turned in the direction indicated by the arrow in Fig. 6, until the portion $g^2$ comes into alignment with the pin $g'$ on the casting, when the piece G can be raised, the pin $g'$ passing through a groove on the inner surface of the piece G. The piece G is then raised high enough to allow the upper free ends of the tripod to clear the same, when it contacts against the pin $g^3$, which prevents its being further raised. The legs or tripod can be folded inwardly, thus occupying the smallest possible space, and the piece G will drop back to that position shown in dotted lines in Fig. 6, thus locking the tripods in their closed position.

To support the maps or charts in such manner that they can be readily inserted and removed from the saddle rings, F, I prefer to make the saddle rings of a main portion or casting, having supporting lugs $f, f'$, and a bent wire or ring F', one end of which is rotatably secured in the lug $f$, and the other adapted to be sprung into a hole $f^2$ in the opposite lug $f'$. By this construction and arrangement, it will be readily seen that maps which are supported by means of small rings can be turned over from one side of the holder to the other, or any particular map can be removed from the supporting saddles without removing the entire lot of maps, as is necessary in present constructions.

From the foregoing description of construction and operation, it will be seen that I have provided a map holder or stand which has an easy vertical adjustment, a frame so constructed as to be folded within a very small compass, means by which the support can be easily rotated in the standard, means by which maps or charts can be easily inserted in their supporting saddle rings and turned from one side of the holder to the other, thus allowing both surfaces to have different maps, and allowing any one or set of maps to be removed from the supporting saddles, without removing the entire lot.

While I have entered into a more or less minute description of the details of my invention, I do not intend to limit myself to specific forms or details of construction; but, on the contrary, to vary form, construction or arrangement as circumstances may suggest or render expedient, without departing from the spirit of my invention.

Having thus described my invention, what I claim, and desire to secure by Letters Patent, is—

1. In a map holder, the combination of a standard, a series of legs pivoted near their upper ends to the standard, and a funnel-shaped piece having a cam surface adapted to engage a pin on the standard with such surface and having a flaring portion adapted to engage the upper ends of the legs and hold them in different positions, substantially as described.

2. In a map holder, the combination of a telescopic standard formed of two parts, one part having a pawl and the other part notches, the pawl engaging with the notches to support the upper part in different vertical positions, a series of legs pivoted near their upper ends to the standard, and a funnel shaped piece having a cam surface adapted to engage a pin on the standard with such surface and having a flaring portion adapted to engage the upper ends of the legs and hold them in different positions, substantially as described.

3. In a map holder, the combination of a standard, a supporting base, a supporting bar, and a saddle ring for holding maps, consisting of a main portion having lugs to which is secured a U-shaped ring, one end of which is rotatably secured in one lug and the other adapted to be sprung into and held in the opposite lug, substantially as described.

HENRY SMITH.

Witnesses:
ROBERT FORESMAN,
THOMAS F. SHERIDAN.